US012765597B2

(12) United States Patent
Reevell

(10) Patent No.: US 12,765,597 B2
(45) **Date of Patent: *Oct. 20, 2026**

(54) AEROSOL-GENERATING SYSTEM INCLUDING SOLID AND LIQUID AEROSOL-FORMING SUBSTRATES

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 791 days.

This patent is subject to a terminal disclaimer.

(21) Appl. No.: 18/147,586

(22) Filed: Dec. 28, 2022

(65) Prior Publication Data

US 2023/0140060 A1 May 4, 2023

Related U.S. Application Data

(63) Continuation of application No. 16/984,562, filed on Aug. 4, 2020, now Pat. No. 11,546,969, which is a (Continued)

(30) Foreign Application Priority Data

Nov. 14, 2016 (EP) .................................... 16198750

(51) Int. Cl.

*A24F 40/46* (2020.01)
*A24F 40/10* (2020.01)

(Continued)

(52) U.S. Cl.

CPC .............. *A24F 40/46* (2020.01); *A24F 40/30* (2020.01); *A24F 40/40* (2020.01); *H05B 1/0227* (2013.01);

(Continued)

(58) Field of Classification Search

CPC .......... A24F 40/10; A24F 40/20; A24F 40/30; A24F 40/40; A24F 40/46; H05B 1/0227; H05B 3/44

(Continued)

(56) References Cited

U.S. PATENT DOCUMENTS 10,279,934 B2 5/2019 Christensen et al.
10,743,583 B2 * 8/2020 Reevell .................... H05B 3/44

(Continued)

FOREIGN PATENT DOCUMENTS

CN 201878765 U * 6/2011 ............. A24F 40/42
CN 102753047 A 10/2012

(Continued)

OTHER PUBLICATIONS

Office Action dated Jan. 16, 2023 issued in related Korean patent application No. 10-2019-7009807.

(Continued)

*Primary Examiner* — Steven W Crabb
*Assistant Examiner* — Ket D Dang
(74) *Attorney, Agent, or Firm* — Harness, Dickey & Pierce, P.L.C.

(57) ABSTRACT

An aerosol-generating system may include a cartridge, a heater section, and an aerosol-generating device. The cartridge may include a cartridge housing, a solid aerosol-forming substrate positioned within the cartridge housing, and a liquid aerosol-forming substrate positioned within the cartridge housing. The heater section is separate from the cartridge and includes an electric heater. The aerosol-generating device may include a device housing configured to receive the cartridge and a power supply for supplying electrical power to the electric heater. The power supply may be positioned within the device housing.

19 Claims, 8 Drawing Sheets

Related U.S. Application Data continuation of application No. 15/812,083, filed on Nov. 14, 2017, now Pat. No. 10,743,583, which is a continuation of application No. PCT/EP2017/076508, filed on Oct. 17, 2017.

(51) Int. Cl.

| | |
|---|---|
| ***A24F 40/20*** | (2020.01) |
| ***A24F 40/30*** | (2020.01) |
| ***A24F 40/40*** | (2020.01) |
| ***H05B 1/02*** | (2006.01) |
| ***H05B 3/44*** | (2006.01) |

(52) U.S. Cl.
CPC ................ *H05B 3/44* (2013.01); *A24F 40/10* (2020.01); *A24F 40/20* (2020.01)

(58) Field of Classification Search
USPC .......................................................... 392/404
See application file for complete search history.

(56) References Cited

U.S. PATENT DOCUMENTS

| | | | | |
|---|---|---|---|---|
| 11,546,969 | B2 * | 1/2023 | Reevell | A24F 40/40 |
| 2008/0092912 | A1 * | 4/2008 | Robinson | A24B 15/167<br>131/200 |
| 2013/0014772 | A1 | 1/2013 | Liu | |
| 2013/0333700 | A1 | 12/2013 | Buchberger | |
| 2014/0166029 | A1 | 6/2014 | Weigensberg et al. | |
| 2014/0246020 | A1 | 9/2014 | Minskoff et al. | |
| 2015/0040929 | A1 * | 2/2015 | Hon | A24F 40/42<br>392/394 |
| 2015/0136158 | A1 | 5/2015 | Stevens et al. | |
| 2015/0216237 | A1 | 8/2015 | Wensley et al. | |
| 2015/0272218 | A1 * | 10/2015 | Chen | A61M 15/06<br>131/329 |
| 2016/0073695 | A1 | 3/2016 | Sears et al. | |
| 2016/0206004 | A1 | 7/2016 | Shinkawa et al. | |
| 2016/0309784 | A1 | 10/2016 | Silvestrini et al. | |
| 2017/0095002 | A1 | 4/2017 | Silvestrini | |
| 2017/0340014 | A1 | 11/2017 | Batista et al. | |

FOREIGN PATENT DOCUMENTS

| | | | |
|---|---|---|---|
| CN | 104768407 | A | 7/2015 |
| CN | 105792689 | A | 7/2016 |
| EP | 3042577 | A1 | 7/2016 |
| JP | 2010-506594 | A | 3/2010 |
| KR | 10-2015-0020182 | A | 2/2015 |
| KR | 10-2015-0127594 | A | 11/2015 |
| KR | 10-2016-0096076 | A | 8/2016 |
| KR | 10-2016-0122713 | A | 10/2016 |
| RU | 2014111081 | A | 10/2015 |
| WO | WO-2008/108889 | A1 | 9/2008 |
| WO | WO-2015/091258 | A1 | 6/2015 |
| WO | WO-2015/117700 | A1 | 8/2015 |
| WO | WO-2015/117701 | A1 | 8/2015 |
| WO | WO-2015/117703 | A1 | 8/2015 |
| WO | WO-2015/117704 | A1 | 8/2015 |
| WO | WO-2015/117705 | A2 | 8/2015 |
| WO | WO-2015/179388 | A1 | 11/2015 |
| WO | WO-2016/062777 | A1 | 4/2016 |
| WO | WO-2016/135331 | A1 | 9/2016 |
| WO | WO-2016/135342 | A2 | 9/2016 |

OTHER PUBLICATIONS

Extended European Search Report #16198750.8 dated Jun. 8, 2017.

Martinne Geller. "British American to Test Tobacco/E-Cigarette Hybrid". Thomson Reuters. Nov. 18, 2015. http://www.reuters.com/article/us-brit-am-tobacco-products-idUSKCN0T71U020151118 <https://protect-us.mimecast.com/s/LL6dBvfk86vhM>.

"HVS: The Next Generation Hybrid Vaping and New Way of Consume Tobacco". Jinjia Technologies. 2009-2014. http://jinjiatech.com/PRODUCTS/Heat/91_<https://protect-us.mimecast.com/s/GWJNBKiQ6NGfa>.

Written Opinion for Application No. PCT/EP2017/076508 dated Jan. 18, 2018.

International Search Report and Written Opinion for PCT/EP2017/076508 dated Jan. 19, 2018.

Notice of Allowance for corresponding Russian Application No. 2019117889 dated Dec. 18, 2020.

First Office Action for corresponding Chinese Application No. 201780065146.6, dated Jun. 3, 2021.

Japanese Notice of Grounds for Rejection for corresponding Application No. 2019-525788, dated Aug. 2, 2021, with English translation.

Japanese Decision to Grant for corresponding Application No. 2019-525788, dated Dec. 6, 2021, English translation included.

Korean Notice of Allowance for Application No. 10-2019-7009807, dated Jul. 25, 2023, with English translation attached.

* cited by examiner

AEROSOL-GENERATING SYSTEM INCLUDING SOLID AND LIQUID AEROSOL-FORMING SUBSTRATES

CROSS-REFERENCE TO RELATED APPLICATIONS

This is a continuation of U.S. application Ser. No. 16/984,562, filed Aug. 4, 2020, which is a continuation of U.S. application Ser. No. 15/812,083, filed on Nov. 14, 2017, which is a continuation of and claims priority to PCT/EP2017/076508, filed on Oct. 17, 2017, and further claims priority to EP 16198750.8, filed on Nov. 14, 2016, the contents of each of which are hereby incorporated by reference in their entirety.

BACKGROUND

Field

Example embodiments relate to an aerosol-generating system (which may also be referred to as an electronic vaping system) including a cartridge having both solid and liquid aerosol-forming substrates. The system may be in a form of an electrically operated smoking system.

Description of Related Art

An aerosol-generating system in a form of an electrically operated smoking system may comprise an aerosol-generating device comprising a battery, control electronics, and an electric heater for heating an aerosol-forming substrate. The aerosol-forming substrate may be contained within the aerosol-generating device. For example, the aerosol-generating device may comprise a liquid storage portion in which a liquid aerosol-forming substrate, such as a nicotine solution, is stored. Some devices have attempted to include a tobacco-based substrate to impart a tobacco taste to the generated aerosol. However, such devices may be impractically large and require the tobacco component and the liquid component to be changed at different times.

SUMMARY

An aerosol-generating system may comprise a cartridge, a heater section, and an aerosol-generating device configured to receive the cartridge. The cartridge may comprise a cartridge housing, a solid aerosol-forming substrate within the cartridge housing, and a porous carrier material within the cartridge housing and holding a liquid aerosol-forming substrate. The cartridge housing and the porous carrier material may define an airflow channel therebetween. A downstream end of the airflow channel may be in fluidic communication with the solid aerosol-forming substrate. The heater section may be structured so as to be separate from the cartridge. The heater section may comprise an electric heater. The aerosol-generating device may comprise a device housing and a power supply within the device housing. The device housing may be configured to receive the cartridge, and the power supply may be configured to supply electrical power to the electric heater.

The heater section may further comprise a liquid transfer element configured to contact the porous carrier material when the aerosol-generating device receives the cartridge.

The cartridge may further comprise a frangible seal, and the heater section may further comprise a piercing element configured to pierce the frangible seal when the aerosol-generating device receives the cartridge.

The piercing element may comprise a hollow shaft portion and a piercing portion at an end of the hollow shaft portion, and at least a portion of the electric heater may be positioned inside the hollow shaft portion.

A first portion of the liquid transfer element may be positioned inside the hollow shaft portion, and the electric heater may comprise a resistive heating coil at least partially wound around the first portion of the liquid transfer element.

The liquid transfer element may extend through an aperture in the hollow shaft portion, and a second portion of the liquid transfer element overlies an outer surface of the hollow shaft portion.

The porous carrier material may have an annular shape defining a passage through the porous carrier material. The piercing portion may be configured to be at least partially received within the passage when the aerosol-generating device receives the cartridge. The second portion of the liquid transfer element may be configured to contact an inner surface of the porous carrier material when the piercing portion is at least partially received within the passage.

The piercing portion may be tapered and comprise a first diameter at a first end of the piercing portion, and the hollow shaft portion may have a shaft diameter adjacent the first end of the piercing portion. The shaft diameter of the hollow shaft portion may be less than the first diameter of the piercing portion.

A thickness of the second portion of the liquid transfer element may be equal to or less than a difference between the first diameter of the piercing portion and the shaft diameter of the hollow shaft portion.

The heater section may further comprise a securing ring positioned around the hollow shaft portion, and at least part of the second portion of the liquid transfer element may be between the securing ring and the hollow shaft portion.

The cartridge may further comprise a removable seal overlying an upstream end of the porous carrier material.

The liquid transfer element may comprise an upstream portion in contact with the electric heater and a downstream portion configured to contact the porous carrier material when the aerosol-generating device receives the cartridge.

The electric heater may comprise a resistive heating mesh.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
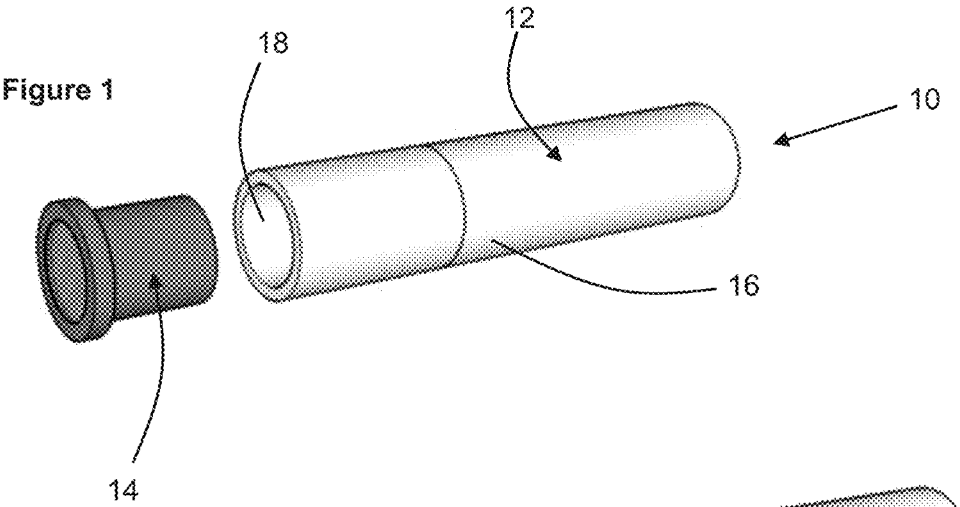
FIG. 1 is a perspective view of an aerosol-generating system wherein the cartridge is separated from the aerosol-generating device according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, illustrative embodiments may be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types. The operations be implemented using existing hardware in existing electronic systems, such as one or more microprocessors, Central Processing Units (CPUs), digital signal processors (DSPs), application-specific-integrated-circuits (ASICs), SoCs, field programmable gate arrays (FPGAs), computers, or the like.

One or more example embodiments may be (or include) hardware, firmware, hardware executing software, or any combination thereof. Such hardware may include one or more microprocessors, CPUs, SoCs, DSPs, ASICs, FPGAs, computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although processes may be described with regard to sequential operations, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

According to some example embodiments, there is provided an aerosol-generating system (which may also be referred to as an electronic vaping system) comprising a cartridge, a heater section, and an aerosol-generating device. The cartridge comprises a cartridge housing, a solid aerosol-forming substrate positioned within the cartridge housing, and a liquid aerosol-forming substrate positioned within the cartridge housing. The heater section may be separate from the cartridge and comprises an electric heater. The aerosol-generating device comprises a device housing configured to receive the cartridge and a power supply for supplying electrical power to the electric heater, the power supply positioned within the device housing.

As used herein, the term "aerosol-forming substrate" is used to describe a substrate capable of releasing volatile compounds, which can form an aerosol. The aerosols generated from aerosol-forming substrates of aerosol-generating systems may be visible or invisible and may include vapours (for example, fine particles of substances, which are in a gaseous state, that are ordinarily liquid or solid at room temperature) as well as gases and liquid droplets of condensed vapours.

Aerosol-generating systems may facilitate a simultaneous replacement of a solid aerosol-forming substrate and a liquid aerosol-forming substrate by providing both substrates in a single cartridge, which may simplify the use of the aerosol-generating system when compared to known devices in which a tobacco-based substrate and a nicotine solution must be replaced or replenished separately.

Providing a solid aerosol-forming substrate and a liquid aerosol-forming substrate in a single cartridge may simplify replenishment of the liquid aerosol-forming substrate. Simplifying a replenishment of the liquid aerosol-forming substrate may facilitate a reduction in the amount of liquid aerosol-forming substrate provided in the cartridge, which may allow the aerosol-generating systems to be smaller.

Aerosol-generating systems according to some example embodiments may provide a heater section that is separate from the cartridge, which may reduce the cost and simplify the manufacture of the cartridge when compared to known devices in which a heater and a liquid aerosol-forming substrate are combined into a single part of an aerosol-generating device. Providing a heater section that is separate from the cartridge may facilitate cleaning of the electric heater, which may facilitate use of the heater section with multiple cartridges. The heater section may form part of the aerosol-generating device. Alternatively, the heater section may be separate from the aerosol-generating device, wherein at least one of the aerosol-generating device and the cartridge is configured to receive the heater section.

In an example embodiment, the aerosol-generating system comprises at least one airflow inlet and at least one airflow outlet. During vaping, air flows through the aerosol-generating system along a flow path from the airflow inlet to the airflow outlet. Air flows along the flow path from an upstream end of the flow path at the airflow inlet to a downstream end of the flow path at the airflow outlet. The aerosol-generating system may be configured so that the solid aerosol-generating substrate is positioned downstream of the liquid aerosol-generating substrate.

The cartridge may comprise a porous carrier material, wherein the liquid aerosol-forming substrate is provided on the porous carrier material. Providing the liquid aerosol-forming substrate on a porous carrier material may reduce the risk of the liquid aerosol-forming substrate leaking from the cartridge.

The porous carrier material may comprise any suitable material or combination of materials which is permeable to the liquid aerosol-forming substrate and allows the liquid aerosol-forming substrate to migrate through the porous carrier material. The material or combination of materials may be inert with respect to the liquid aerosol-forming substrate. The porous carrier material may or may not be a capillary material. The porous carrier material may comprise a hydrophilic material to improve distribution and spread of the liquid aerosol-forming substrate. This may assist with consistent aerosol formation. The particular material or materials will depend on the physical properties of the liquid aerosol-forming substrate. Examples of suitable materials are a capillary material, for example a sponge or foam material, ceramic- or graphite-based materials in the form of fibres or sintered powders, a foamed metal or plastics material, a fibrous material, for example made of spun or extruded fibres, such as cellulose acetate, polyester, or bonded polyolefin, polyethylene, terylene or polypropylene fibres, nylon fibres or ceramic. The porous carrier material may have any suitable porosity so as to be used with different liquid physical properties.

The aerosol-generating system may comprise a liquid transfer element configured for the transfer of the liquid aerosol-forming substrate toward the electric heater during vaping. A liquid transfer element may facilitate contact between the liquid aerosol-forming substrate and the electric heater during vaping.

The liquid transfer element may form part of the heater section. In example embodiments in which the cartridge comprises a porous carrier material on which the liquid aerosol-forming substrate is provided, the heater section may comprise the liquid transfer element, wherein the aerosol-generating system is configured so that the liquid transfer element contacts the porous carrier material.

The liquid transfer element may comprise any suitable material or combination of materials which is able to convey the liquid aerosol-forming substrate along its length. The liquid transfer element may be formed from a porous material, but this need not be the case. The liquid transfer element may be formed from a material having a fibrous or spongy structure. The liquid transfer element may comprise a bundle of capillaries. For example, the liquid transfer element may comprise a plurality of fibres or threads or other fine bore tubes. The liquid transfer element may comprise sponge-like or foam-like material. The structure of the liquid transfer element may form a plurality of small bores or tubes, through which the liquid aerosol-forming substrate can be transported by capillary action. The particular material or materials will depend on the physical properties of the liquid aerosol-forming substrate. Examples of suitable capillary materials include a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres, ceramic, glass fibres, silica glass fibres, carbon fibres, metallic fibres of medical grade stainless steel alloys such as austenitic 316 stainless steel and martensitic 440 and 420 stainless steels. The liquid transfer element may have any suitable capillarity so as to be used with different liquid physical properties. The liquid aerosol-forming substrate has physical properties, including but not limited to viscosity, surface tension, density, thermal conductivity, boiling point and vapour pressure, which allow the liquid aerosol-forming substrate to be transported through the liquid transfer element. The liquid transfer element may be formed from heat-resistant material. The liquid transfer element may comprise a plurality of fibre strands. The plurality of fibre strands may be generally aligned along a length of the liquid transfer element.

In example embodiments in which the aerosol-generating system comprises a porous carrier material and a liquid transfer element, the porous carrier material and the liquid transfer element may comprise the same material. Alternatively, the porous carrier material and the liquid transfer element may comprise different materials.

The cartridge may comprise a frangible seal. A frangible seal may reduce or prevent the loss of volatile compounds from one or both of the solid aerosol-forming substrate and the liquid aerosol-forming substrate. The frangible seal may extend across an opening defined by the cartridge housing. The frangible seal may extend across an end of the cartridge. The frangible seal may be secured to the cartridge housing about a periphery of the frangible seal. The frangible seal may be secured to the cartridge housing by at least one of an adhesive and a weld, such as an ultrasonic weld. The frangible seal may be formed from a sheet material. The sheet material may comprise at least one of a polymeric film and a metallic foil.

The frangible seal may comprise a first frangible seal upstream of the porous carrier material and a second frangible seal downstream of the porous carrier material.

The aerosol-generating system may comprise a piercing element configured to pierce the frangible seal when the aerosol-generating device receives the cartridge. A piercing element may automatically pierce the frangible seal when the aerosol-generating device and the heater section are combined with the cartridge. In example embodiments in which the frangible seal comprises first and second frangible seals, the piercing element may be configured to pierce both the first and second frangible seals when the aerosol-generating device receives the cartridge.

The heater section may comprise the piercing element.

At least a portion of the electric heater may form the piercing element. The electric heater may be in the form of a heater blade configured to pierce the frangible seal.

The piercing element may be formed separately from the electric heater. The piercing element may comprise a hollow shaft portion and a piercing portion at an end of the hollow shaft portion. A hollow shaft portion may allow airflow through the hollow shaft portion during use of the aerosol-generating system. The piercing portion may comprise an airflow aperture extending through the piercing portion and in fluid communication with the interior of the hollow shaft portion. At least a portion of the interior of the hollow shaft portion may define an airflow passage extending along at least a portion of the hollow shaft portion.

At least a portion of the electric heater may be positioned inside the hollow shaft portion. At least a portion of the electric heater may extend transversely across a portion of the airflow passage. The electric heater and the hollow shaft portion may be configured so that, during vaping, airflow through the airflow passage passes across the portion of the electric heater positioned inside the hollow shaft portion.

A first portion of the liquid transfer element may be positioned inside the hollow shaft portion. The first portion of the liquid transfer element may extend transversely across a portion of the airflow passage. The liquid transfer element and the hollow shaft portion may be configured so that, during vaping, airflow through the airflow passage passes across the first portion of the liquid transfer element.

The electric heater may comprise a resistive heating coil. The resistive heating coil may be at least partially wound around the first portion of the liquid transfer element.

The liquid transfer element may extend through a first aperture in the hollow shaft portion, wherein a second portion of the liquid transfer element overlies an outer surface of the hollow shaft portion. The second portion of the liquid transfer element may be a first end of the liquid transfer element. The liquid transfer element may extend through a second aperture in the hollow shaft portion, wherein a third portion of the liquid transfer element overlies the outer surface of the hollow shaft portion. The second aperture may be opposite the first aperture. The third portion of the liquid transfer element may be a second end of the liquid transfer element. The first portion of the liquid transfer element may be an intermediate portion of the liquid transfer element between the second and third portions.

The aerosol-generating system may comprise a securing ring positioned around part of the hollow shaft portion, wherein at least part of the second portion of the liquid transfer element is positioned between the securing ring and the hollow shaft portion. In example embodiments in which the liquid transfer element comprises a third portion overlying the outer surface of the hollow shaft portion, at least part of the third portion of the liquid transfer element may be positioned between the securing ring and the hollow shaft portion.

The porous carrier material may have an annular shape defining a passage through the porous carrier material. When the cartridge is combined with the aerosol-generating device, the passage defined through the porous carrier material may form part of the flow path through the aerosol-generating system from the at least one airflow inlet to the at least one airflow outlet.

The aerosol-generating system may be configured so that the piercing element is at least partially received within the passage when the aerosol-generating device receives the cartridge. The aerosol-generating system may be configured so that the second portion of the liquid transfer element contacts an inner surface of the porous carrier material when the piercing portion is at least partially received within the passage. In example embodiments in which the liquid transfer element comprises a third portion, the aerosol-generating system may be configured so that the third portion of the liquid transfer element contacts the inner surface of the porous carrier material when the piercing portion is at least partially received within the passage.

The aerosol-generating system may be configured so that, when the piercing portion is at least partially received within the passage, a downstream end of the airflow passage defined by the hollow shaft portion is in fluid communication with the solid aerosol-forming substrate. In example embodiments in which the hollow shaft portion comprises an airflow aperture, the downstream end of the airflow passage may be in fluid communication with the solid aerosol-forming substrate via the airflow aperture.

The at least one airflow inlet may be in fluid communication with an upstream end of the airflow passage defined by the hollow shaft portion.

The solid aerosol-forming substrate may be in fluid communication with the at least one airflow outlet.

The piercing portion may be tapered and comprise a first diameter (e.g., maximum diameter) at a first end of the piercing portion adjacent the hollow shaft portion. The piecing portion may comprise a second diameter (e.g., minimum diameter) at a second end of the piercing portion. The second end of the piercing portion is configured to pierce the frangible seal of the cartridge.

The hollow shaft portion may have a first diameter or shaft diameter adjacent the first end of the piercing portion, wherein the first diameter of the hollow shaft portion is less than the first diameter (e.g., maximum diameter) of the piercing portion. In example embodiments in which the aerosol-generating system comprises a liquid transfer element having a second portion overlying an outer surface of the hollow shaft portion, the thickness (e.g., maximum thickness) of the second portion of the liquid transfer element may be equal to or less than the difference between the first diameter (e.g., maximum diameter) of the piercing portion and the first diameter of the hollow shaft portion. In example embodiments in which the liquid transfer element has a third portion overlying the outer surface of the hollow shaft portion, the thickness (e.g., maximum combined thickness) of the second and third portions of the liquid transfer element may be equal to or less than the difference between the first diameter (e.g., maximum diameter) of the piercing portion and the first diameter of the hollow shaft portion. Such arrangements may reduce stress on the liquid transfer element when the cartridge is combined with the aerosol-generating device, particularly in example embodiments in which the piercing element is received within a passage extending through the porous carrier material.

The cartridge may comprise an airflow channel positioned between the porous carrier material and the cartridge housing. A downstream end of the airflow channel may be in fluid communication with the solid aerosol-forming substrate. The airflow channel may be in addition to, or an alternative to, a passage extending through the porous carrier material.

In example embodiments in which the aerosol-generating system comprises a piercing element having a hollow shaft portion, the interior of the hollow shaft portion may be in fluid communication with the at least one airflow inlet. The hollow shaft portion may define at least one aperture to provide fluid communication between the interior of the hollow shaft portion and an upstream end of the airflow channel positioned between the porous carrier material and the cartridge housing.

The cartridge may comprise a removable seal overlying an upstream end of the porous carrier material. The removable seal may be secured to the cartridge housing about a periphery of the removable seal. The removable seal may be secured to the cartridge housing by at least one of an adhesive and a weld, such as an ultrasonic weld. The removable seal may be formed from a sheet material. The sheet material may comprise at least one of a polymeric film and a metallic foil. The removable seal may be configured for removal from the cartridge before combining the cartridge with the aerosol-generating device. The removable seal may comprise a pull tab to facilitate removal of the seal.

In example embodiments in which the aerosol-generating system comprises a liquid transfer element, the liquid transfer element may comprise a downstream portion configured to contact the porous carrier material and an upstream portion in contact with the electric heater.

The electric heater may comprise a resistive heating coil. The resistive heating coil may be at least partially wound around the upstream portion of the liquid transfer element. The heater section may comprise a heater support, wherein the resistive heating coil is at least partially wound around the heater support.

The electric heater may comprise a resistive heating mesh. The resistive heating mesh may overlie the upstream portion of the liquid transfer element.

The resistive heating mesh may comprise a plurality of electrically conductive filaments. The electrically conductive filaments may be substantially flat. As used herein, "substantially flat" means formed in a single plane and not wrapped around or otherwise conformed to fit a curved or other non-planar shape. A flat heating mesh can be handled with greater ease during manufacture and provides for a relatively robust construction.

The electrically conductive filaments may define interstices between the filaments, and the interstices may have a width of between about 10 micrometres and about 100 micrometres. In an example embodiment, the filaments give rise to capillary action in the interstices, so that liquid aerosol-forming substrate is drawn into the interstices, thereby increasing the contact area between the heater assembly and the liquid aerosol-forming substrate.

The electrically conductive filaments may form a mesh of a size between about 160 Mesh US and about 600 Mesh US (+/−10%) (that is, between about 160 and about 600 filaments per inch (+/−10%)). The width of the interstices may be between about 75 micrometres and about 25 micrometres. The percentage of open area of the mesh, which is the ratio of the area of the interstices to the total area of the mesh, may be between about 25 percent and about 56 percent. The mesh may be formed using different types of weave or lattice structures. The electrically conductive filaments may be an array of filaments arranged parallel to one another.

The electrically conductive filaments may have a diameter of between about 8 micrometres and about 100 micrometres (e.g., between about 8 micrometres and about 50 micrometres, between about 8 micrometres and about 39 micrometres).

The resistive heating mesh may cover an area of less than or equal to about 25 square millimetres. The resistive heating mesh may be rectangular. In another instance, the resistive heating mesh may be square. The resistive heating mesh may have dimensions of about 5 millimetres by about 2 millimetres.

The electrically conductive filaments may comprise any suitable electrically conductive material. Suitable materials include but are not limited to semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, constantan, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. The filaments may be coated with one or more insulators. Examples of materials for the electrically conductive filaments include 304, 316, 304L, and 316L stainless steel, and graphite.

The electrical resistance of the resistive heating mesh may be between about 0.3 and about 4 Ohms. In an example embodiment, the electrical resistance of the mesh is between about 0.5 and about 3 Ohms (e.g., about 1 Ohm).

In example embodiments in which the electric heater comprises a resistive heating coil, the pitch of the coil may be between about 0.5 millimetres and about 1.5 millimetres (e.g., about 1.5 millimetres). The pitch of the coil is the spacing between adjacent turns of the coil. The coil may comprise fewer than six turns (e.g., fewer than five turns). The coil may be formed from an electrically resistive wire having a diameter of between about 0.10 millimetres and about 0.15 millimetres (e.g., about 0.125 millimetres). The electrically resistive wire may be formed of 904 or 301 stainless steel. Examples of other suitable metals include titanium, zirconium, tantalum and metals from the platinum group. Examples of other suitable metal alloys include, Constantan, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. The resistive heating coil may also comprise a metal foil, such as an aluminium foil, which is provided in the form of a ribbon.

The cartridge housing may be tubular and comprise an upstream end and a downstream end. The solid aerosol-forming substrate may be positioned within the downstream end. The porous carrier material may be positioned within the upstream end.

The porous carrier material may be positioned directly within the cartridge housing. The porous carrier material may be retained within the cartridge housing by an interference fit.

The porous carrier material may be positioned within a liquid storage housing, wherein the liquid storage housing is positioned within the cartridge housing. The liquid storage housing may be retained within the cartridge housing by an interference fit.

An outer surface of the liquid storage housing may be shaped to substantially reduce or prevent airflow between the cartridge housing and the liquid storage housing when the liquid storage housing is received within the cartridge housing.

An outer surface of the liquid storage housing may also be shaped to define an airflow channel between the cartridge housing and the liquid storage housing when the liquid storage housing is received within the cartridge housing. The outer surface of the liquid storage housing may comprise a groove to define the airflow channel when the liquid storage housing is received within the cartridge housing.

The liquid storage housing may be tubular. The tubular liquid storage housing may have an open upstream end and an open downstream end. In example embodiments in which the cartridge comprises first and second frangible seals, the first frangible seal may extend across the upstream end of the liquid storage housing and the second frangible seal may extend across the downstream end of the liquid storage housing. The porous carrier material is positioned between the first and second frangible seals. The first and second frangible seals may be secured to the liquid storage housing instead of the cartridge housing.

The tubular liquid storage housing may have an open upstream end and a closed downstream end. In example embodiments in which the cartridge comprises a frangible seal, the frangible seal may extend across the upstream end of the liquid storage housing. The porous carrier material is positioned between the frangible seal and the closed end. The frangible seal may be secured to the liquid storage housing instead of the cartridge housing. In example embodiments in which the cartridge comprises a removable seal, the removable seal may extend across the upstream end of the liquid storage housing. The porous carrier material is positioned between the removable seal and the closed end. The removable seal may be secured to the liquid storage housing instead of the cartridge housing.

The solid aerosol-forming substrate may be retained in the cartridge housing by an interference fit.

The cartridge may comprise a filter positioned downstream of the solid aerosol-forming substrate. The filter may comprise a plug of filter material positioned within the downstream end of the cartridge housing. The plug of filter material may be retained within the cartridge housing by an interference fit. The filter may comprise a sheet material extending across a downstream opening of the cartridge housing. The sheet material may comprise a mesh. The sheet material may be secured to the cartridge housing by at least one of an adhesive and a weld, such as an ultrasonic weld. The filter may retain the solid aerosol-forming substrate in the cartridge housing.

The aerosol-generating system may comprise a mouthpiece. In example embodiments in which the aerosol-generating system comprises at least one airflow outlet, the mouthpiece may comprise the at least one airflow outlet. The mouthpiece may form part of the cartridge. The mouthpiece may form part of the aerosol-generating device. The mouthpiece may be formed separately from the cartridge and the aerosol-generating device, wherein at least one of the cartridge and the aerosol-generating device is configured to receive the mouthpiece.

The solid aerosol-forming substrate may comprise tobacco. The solid aerosol-forming substrate may comprise a tobacco-containing material containing volatile tobacco flavour compounds which are released from the substrate upon heating.

The solid aerosol-forming substrate may comprise tobacco containing deprotonated nicotine. Deprotonating the nicotine within tobacco may increase the volatility of the nicotine. Nicotine may be deprotonated by subjecting the tobacco to an alkalising treatment.

The solid aerosol-forming substrate may comprise a non-tobacco material. The solid aerosol-forming substrate may comprise tobacco-containing material and non-tobacco containing material.

The solid aerosol-forming substrate may include at least one aerosol-former. As used herein, the term “aerosol former” is used to describe any suitable known compound or mixture of compounds that facilitates the formation of an aerosol. Suitable aerosol-formers include, but are not limited to, polyhydric alcohols, such as propylene glycol, triethylene glycol, 1,3-butanediol, and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate In an example embodiment, the aerosol formers are polyhydric alcohols or mixtures thereof, such as propylene glycol, triethylene glycol, 1,3-butanediol, and glycerine.

The solid aerosol-forming substrate may comprise a single aerosol former. Alternatively, the solid aerosol-forming substrate may comprise a combination of two or more aerosol formers.

The solid aerosol-forming substrate may have an aerosol former content of greater than 5 percent on a dry weight basis.

For example, the solid aerosol-forming substrate may have an aerosol former content of between approximately 5 percent and approximately 30 percent on a dry weight basis.

In a non-limiting embodiment, the solid aerosol-forming substrate may have an aerosol former content of approximately 20 percent on a dry weight basis.

The liquid aerosol-forming substrate may comprise a tobacco-containing material comprising volatile tobacco flavour compounds which are released from the liquid upon heating. The liquid aerosol-forming substrate may also comprise a non-tobacco material in lieu of (or in addition to) the tobacco-containing material. The liquid aerosol-forming substrate may include water, solvents, ethanol, plant extracts, and natural or artificial flavours. The liquid aerosol-forming substrate may comprise an aerosol former. Suitable aerosol formers include polyhydric alcohols or mixtures thereof, such as propylene glycol, triethylene glycol, 1,3-butanediol, and glycerine.

The liquid aerosol-forming substrate may comprise nicotine.

Alternatively, the liquid aerosol-forming substrate may be free from nicotine. In such example embodiments, the vaporised liquid aerosol-forming substrate may be drawn through the solid aerosol-forming substrate during vaping to strip one or more volatile compounds from the solid aerosol-forming substrate. The vaporised liquid aerosol-forming substrate may strip nicotine from the solid-aerosol-forming substrate. A solid aerosol-forming substrate comprising tobacco containing deprotonated nicotine may be particularly suited to example embodiments in which the liquid aerosol-forming substrate is free from nicotine.

The power supply may comprise a battery. For example, the power supply may be a nickel-metal hydride battery, a nickel cadmium battery, or a lithium based battery, for example a lithium-cobalt, a lithium-iron-phosphate or a lithium-polymer battery. The power supply may alternatively be another form of charge storage device such as a capacitor. The power supply may require recharging and may have a capacity that allows for the storage of enough energy for use of the aerosol-generating device with more than one cartridge.

The aerosol-generating device may comprise a controller for controlling the supply of electrical power from the power supply to the electric heater.

Figure 2:
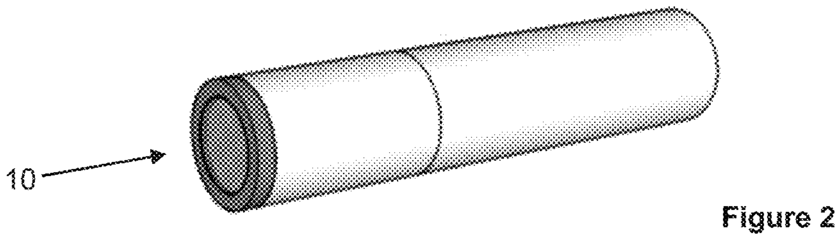
FIG. 2 is a perspective view of the aerosol-generating system of FIG. 1 wherein the cartridge is inserted into the aerosol-generating device.

FIGS. 1 and 2 show an aerosol-generating system 10 according to an example embodiment. The aerosol-generating system 10 comprises an aerosol-generating device 12 and a cartridge 14. The aerosol-generating device 12 comprises a device housing 16 defining a cavity 18 for receiving an upstream end of the cartridge 14. FIG. 1 shows the cartridge 14 when separated from the aerosol-generating device 12, and FIG. 2 shows the cartridge 14 when received within the cavity 18 of the aerosol-generating device 12.

Figure 3:
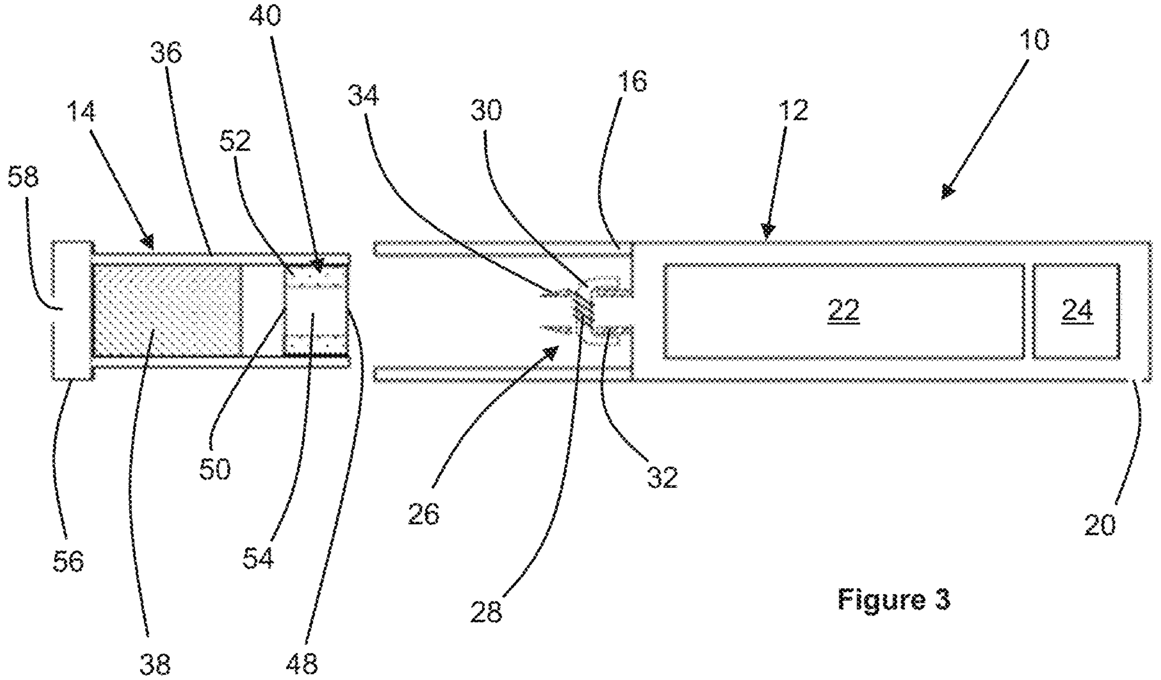
FIG. 3 is a cross-sectional view of the aerosol-generating system of FIG. 1.

FIG. 3 shows a cross-sectional view of the aerosol-generating system 10 when the cartridge 14 is separated from the aerosol-generating device 12. The aerosol-generating device 12 comprises an airflow inlet 20 positioned at an upstream end of the device housing 16. A power supply 22 and a controller 24 are positioned within the upstream end of the device housing 16.

The aerosol-generating system 10 further comprises a heater section 26. As shown in FIG. 3, the heater section 26 forms part of the aerosol-generating device 12. However, the heater section 26 may be provided separately and configured to connect to the aerosol-generating device 12.

The heater section 26 is positioned at an upstream end of the cavity 18 and comprises an electric heater 28 in the form of a resistive heating coil. During vaping, the controller 24 controls a supply of electrical power from the power supply 22 to the electric heater 28. The heater section 26 further comprises a liquid transfer element 30 in the form of a capillary wick, the resistive heating coil wound around a first portion of the liquid transfer element 30.

The electric heater 28 and the liquid transfer element 30 are supported by a piercing element extending from an upstream end wall of the cavity 18. The piercing element comprises a hollow shaft portion 32 and a piercing portion 34. The electric heater 28 and the first portion of the liquid transfer element 30 are positioned in an airflow passage formed within the hollow shaft portion 32. Second and third portions of the liquid transfer element 30 extend through apertures in the hollow shaft portion 32, the second and third portions folded through a 90 degree angle so that they overlie an outer surface of the hollow shaft portion 32.

Figure 4:
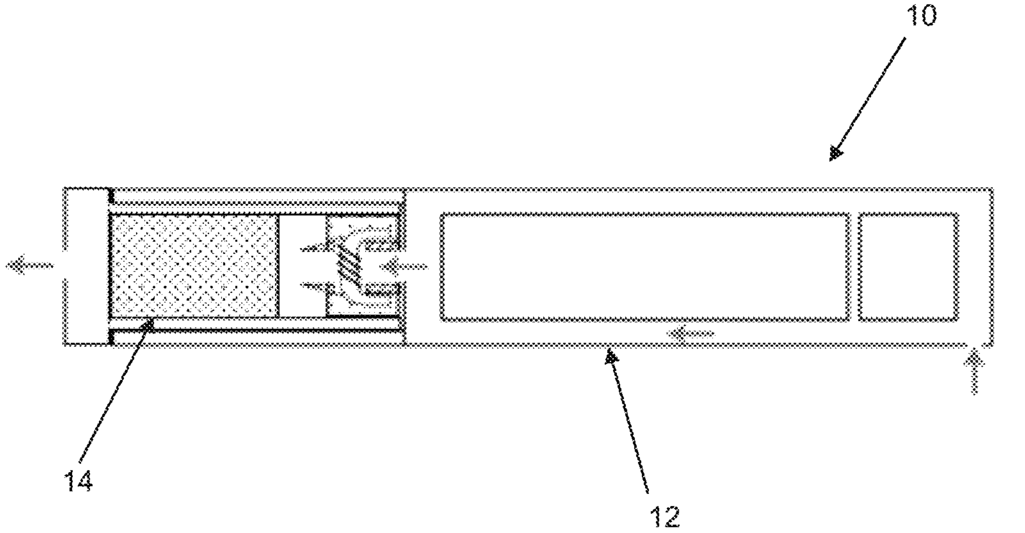
FIG. 4 is a cross-sectional view of the aerosol-generating system of FIG. 2.
Figure 5:
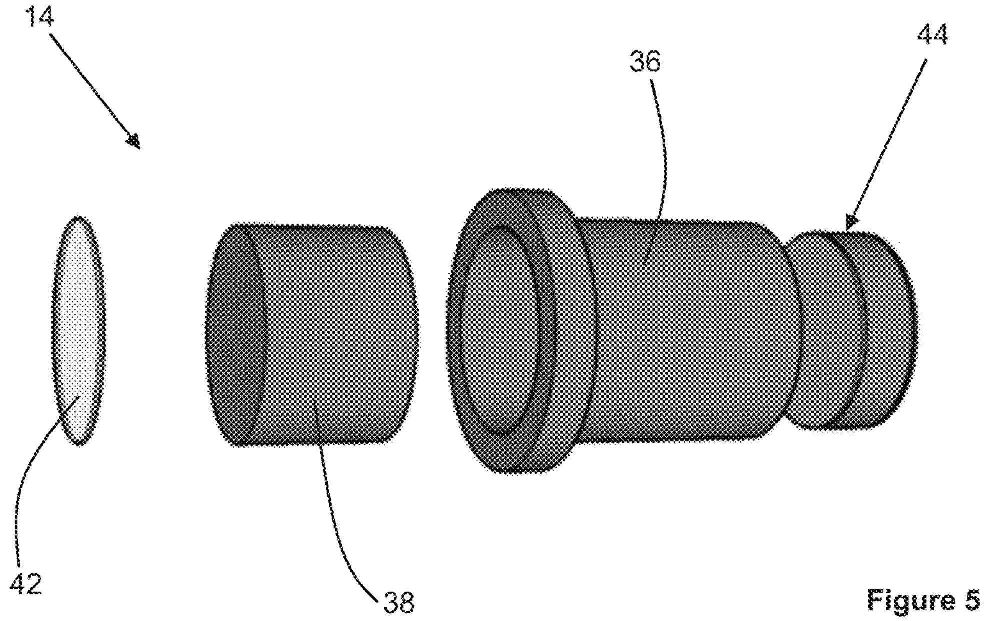
FIG. 5 is an exploded view of the cartridge of the aerosol-generating system of FIG. 1.

The cartridge 14 comprises a cartridge housing 36, and a solid aerosol-forming substrate 38 and a liquid aerosol-forming substrate 40 both positioned within the cartridge housing 36. FIG. 4 shows a cross-sectional view of the aerosol-generating system 10 when the cartridge 14 is received within the cavity 18 of the aerosol-generating device 12. FIG. 5 shows an exploded view of the cartridge 14.

The solid aerosol-forming substrate 38 may comprise a tobacco plug positioned within the downstream end of the cartridge housing 36. As shown in FIG. 5, a mesh filter 42 is attached to a downstream end of the cartridge housing 36 to retain the tobacco plug within the cartridge housing 36.

Figure 6:
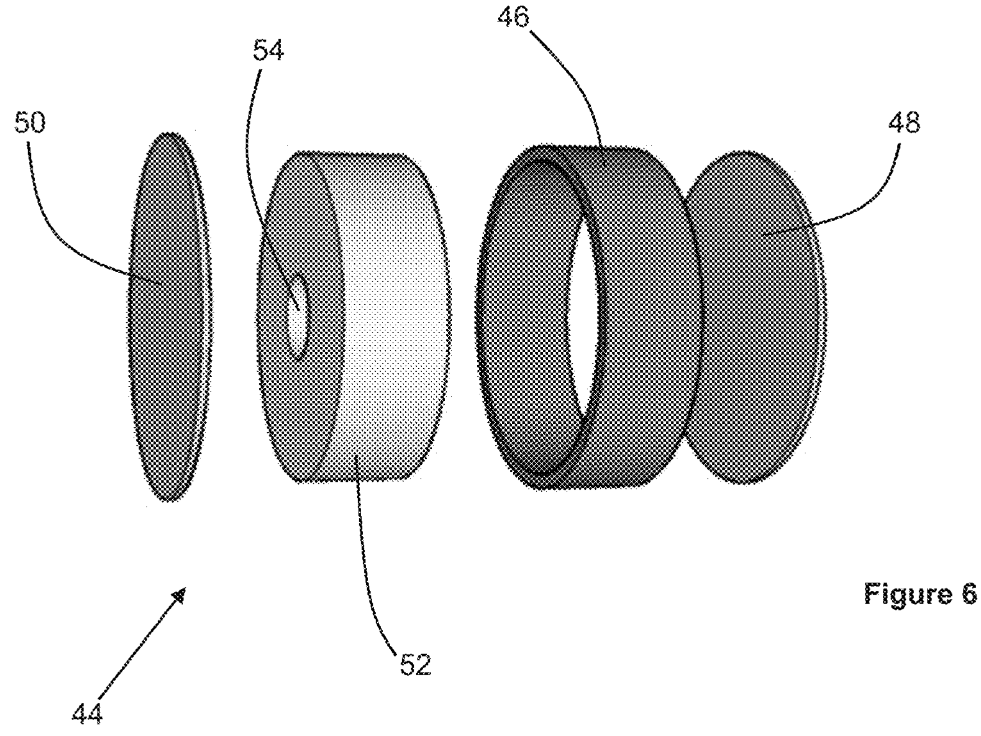
FIG. 6 is an exploded view of the liquid storage assembly of the cartridge of FIG. 5.

The liquid aerosol-forming substrate 40 is contained within a liquid storage assembly 44 positioned within the upstream end of the cartridge housing 36. The liquid storage assembly 44 is shown in more detail in a further exploded view in FIG. 6.

The liquid storage assembly 44 comprises a tubular liquid storage housing 46 that is retained within the upstream end of the cartridge housing 36 by an interference fit. A first frangible seal 48 extends across and is secured to the upstream end of the tubular liquid storage housing 46 and a second frangible seal 50 extends across and is secured to the downstream end of the tubular liquid storage housing 46. A porous carrier material 52 is positioned within the tubular liquid storage housing 46 between the first and second frangible seals 48, 50 and the liquid aerosol-forming substrate 40 is sorbed into the porous carrier material 52. The porous carrier material 52 has an annular shape and defines a passage 54 through the porous carrier material 52, the passage 54 extending between the first and second frangible seals 48, 50.

The downstream end of the cartridge housing 36 forms a mouthpiece 56, the mouthpiece 56 defining an airflow outlet 58 of the aerosol-generating system 10.

As noted supra, FIG. 4 shows a cross-sectional view of the aerosol-generating system 10 after the cartridge 14 has been inserted into the cavity 18 of the aerosol-generating device 12. When the cartridge 14 is inserted into the cavity 18 the piercing portion 34 of the piercing element pierces the first and second frangible seals 48, 50. The heater section 26 is received within the passage 54 defined through the porous carrier material 52 so that the second and third portions of the liquid transfer element 30 contact the inner surface of the porous carrier material 52. Liquid aerosol-forming substrate 40 is wicked along the liquid transfer element 30 to the electric heater 28 where it is vaporised. When a negative pressure is applied to the mouthpiece 56, air is drawn into the aerosol-generating system 10 through the airflow inlet 20, through the aerosol-generating device 12, through the hollow shaft portion 32 where liquid aerosol-forming substrate vapour is entrained in the airflow, through the solid aerosol-forming substrate 38 where further volatile compounds are entrained in the airflow, and out through the airflow outlet 58.

Figure 7:
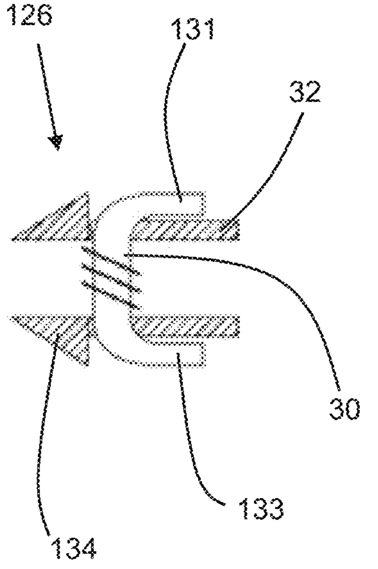
FIG. 7 is a cross-sectional view of a heater section of an aerosol-generating system according to an example embodiment.

FIG. 7 shows an alternative arrangement of a heater section 126 according to an example embodiment. The heater section 126 is similar in construction to the heater section 26 described with reference to FIG. 3, and like reference numerals are used to designate like parts.

Figure 8:
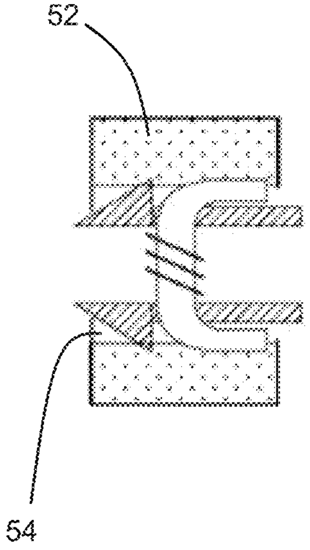
FIG. 8 is a cross-sectional view of the heater section of FIG. 7 when inserted into a porous carrier material.

The heater section 126 differs from the heater section 26 by the diameter (e.g., maximum diameter) of the piercing portion 134. In particular, the diameter (e.g., maximum diameter) of the piercing portion 134 is slightly larger than the combined diameter of the hollow shaft portion 32 and the second and third portions 131, 133 of the liquid transfer element 30. Therefore, the wider piercing portion 134 of the heater section 126 may reduce the risk of damage to the liquid transfer element 30 when the heater section 126 is inserted into and removed from the passage 54 defined through the porous carrier material 52, as shown in FIG. 8.

Figure 9:
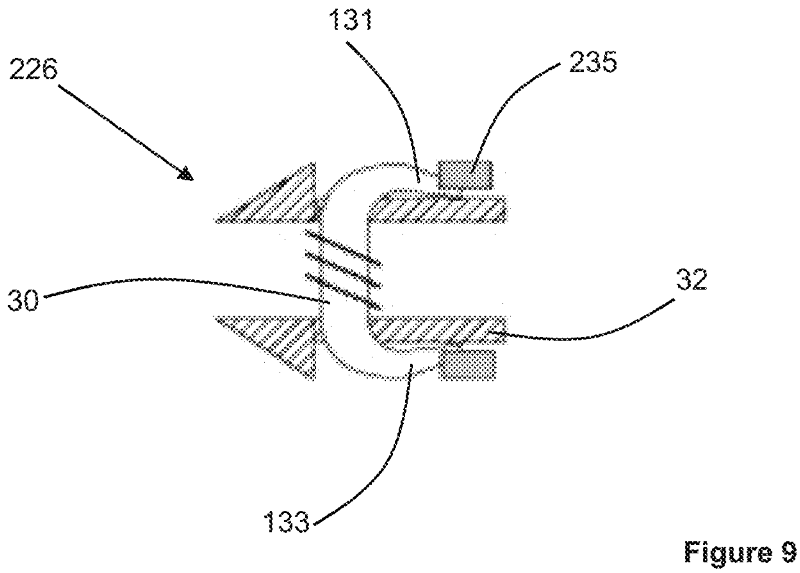
FIG. 9 is a cross-sectional view of another heater section of an aerosol-generating system according to an example embodiment.

FIG. 9 shows an alternative arrangement of a heater section 226 according to an example embodiment. The heater section 226 is similar in construction to the heater section 126 described with reference to FIG. 7, and like reference numerals are used to designate like parts.

The heater section 226 differs from the heater section 126 by the addition of a securing ring 235 positioned about the upstream end of the hollow shaft portion 32. The ends of the second and third portions 131, 133 of the liquid transfer element 30 are secured between the securing ring 235 and the hollow shaft portion 32 to retain the liquid transfer element 30 in the correct position during insertion and removal of the heater section 226 into and from the passage 54 defined through the porous carrier material 52.

Figure 10:
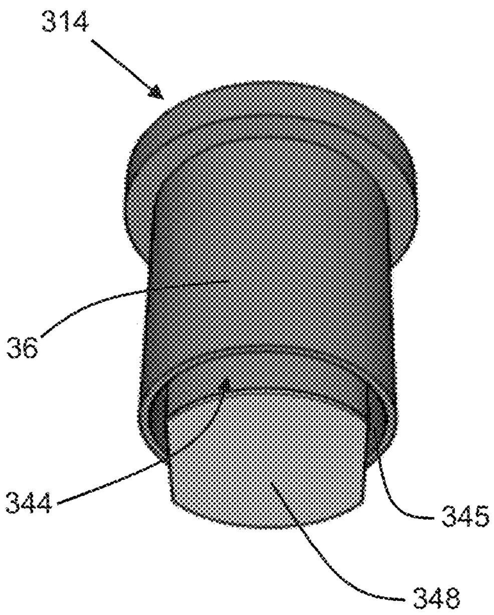
FIG. 10 is a perspective view of a cartridge of an aerosol-generating system according to an example embodiment.
Figure 11:
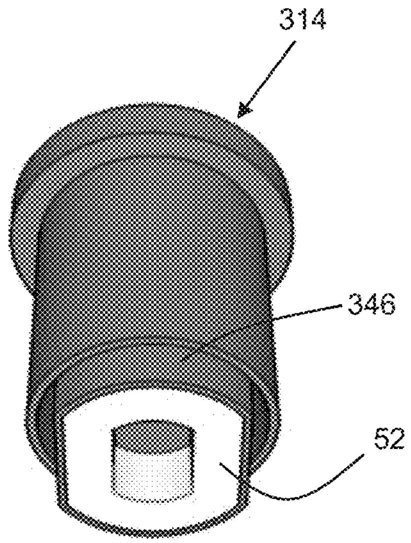
FIG. 11 is a perspective view of the cartridge of FIG. 10 with the frangible seal removed to show the porous carrier material.

FIGS. 10 and 11 show an alternative arrangement of a cartridge 314 according to an example embodiment. The cartridge 314 is similar in construction to the cartridge 14 described with reference to FIGS. 1 to 6, and like reference numerals are used to designate like parts.

The cartridge 314 comprises a cartridge housing 36, a solid aerosol-forming substrate 38, a liquid aerosol-forming substrate 40 and a mesh filter 42 as described previously. The cartridge 314 differs in the construction of the liquid storage assembly 344.

The liquid storage assembly 344 comprises a tubular liquid storage housing 346 that is open at its upstream end and closed at its downstream end. The liquid storage housing 346 has a smaller cross-sectional area than the cartridge housing 36 to define an airflow passage 345 between the liquid storage housing 346 and the cartridge housing 36.

A first frangible seal 348 extends across and is secured to the upstream end of the tubular liquid storage housing 346 and a porous carrier material 52 containing the liquid aerosol-forming substrate 40 is positioned within the tubular liquid storage housing 346 between the first frangible seal 348 and the downstream end of the tubular liquid storage housing 346. As described herein, the porous carrier material 52 has an annular shape and defines a passage 54 through the porous carrier material 52. To illustrate the porous carrier material 52, FIG. 11 shows the cartridge 314 with the first frangible seal 348 removed.

Figure 12:
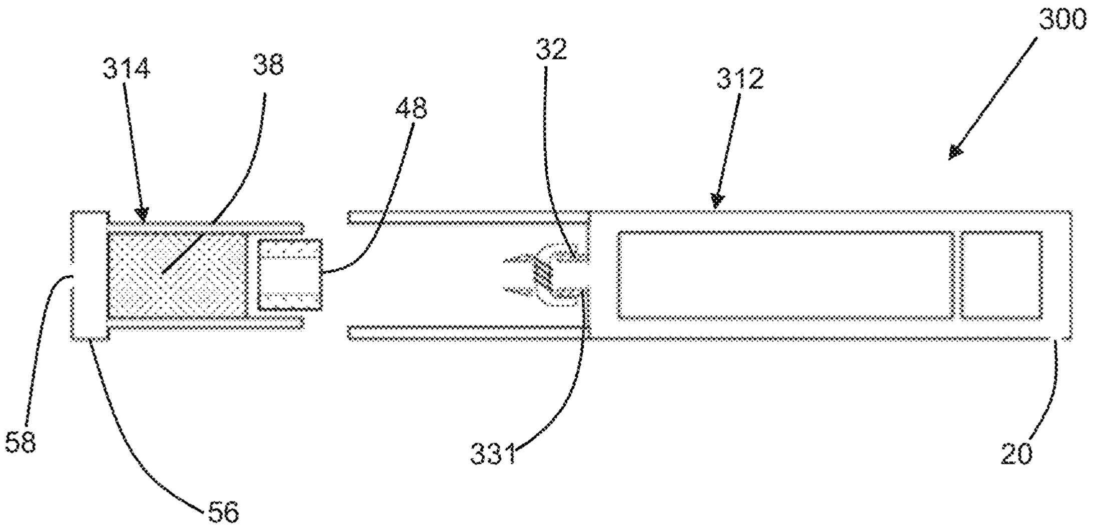
FIG. 12 is a cross-sectional view of an aerosol-generating system including the cartridge of FIG. 10 wherein the cartridge is separated from the aerosol-generating device.

FIG. 12 shows an aerosol-generating system 300 comprising the cartridge 314 of FIGS. 10 and 11 in combination with an aerosol-generating device 312. The aerosol-generating device 312 may be the same as the aerosol-generating device 12 described with reference to FIGS. 1 to 4 except for the addition of one or more airflow apertures 331 at the upstream end of the hollow shaft portion 32.

Figure 13:
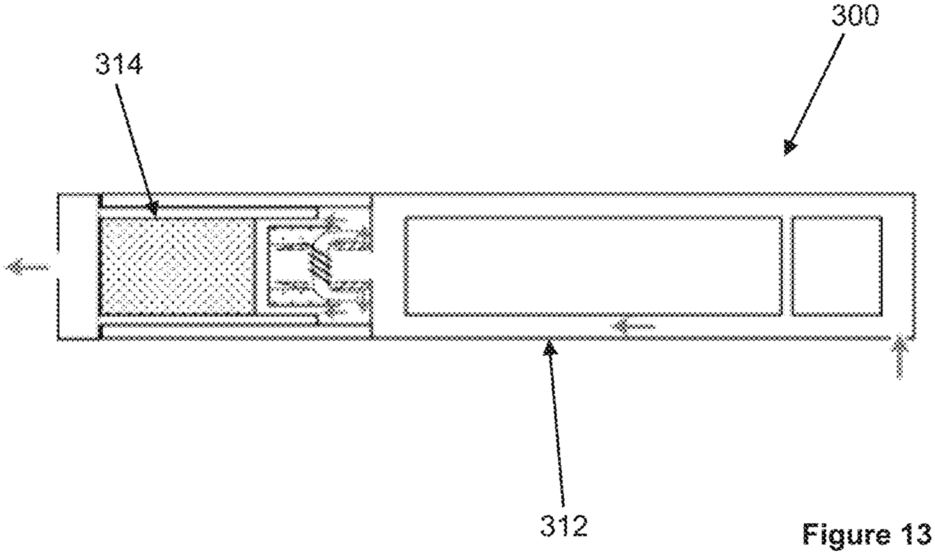
FIG. 13 is a cross-sectional view of the aerosol-generating system of FIG. 12 wherein the cartridge is inserted into the aerosol-generating device.

FIG. 13 shows a cross-sectional view of the aerosol-generating system 300 after the cartridge 314 has been inserted into the cavity 18 of the aerosol-generating device 312. When the cartridge 314 is inserted into the cavity 18 the piercing portion 34 of the piercing element pierces the first frangible seal 48. The heater section 26 is received within the passage 54 defined through the porous carrier material 52 so that the second and third portions of the liquid transfer element 30 contact the inner surface of the porous carrier material 52. Liquid aerosol-forming substrate 40 is wicked along the liquid transfer element 30 to the electric heater 28 where it is vaporised. When a negative pressure is applied to the mouthpiece 56, air is drawn into the aerosol-generating system 300 through the airflow inlet 20, through the aerosol-generating device 312, into the hollow shaft portion 32 where liquid aerosol-forming substrate vapour is entrained in the airflow, through the airflow apertures 331 and through the airflow passage 345 in the cartridge 314, through the solid aerosol-forming substrate 38 where further volatile compounds are entrained in the airflow, and out through the airflow outlet 58.

Figure 14:
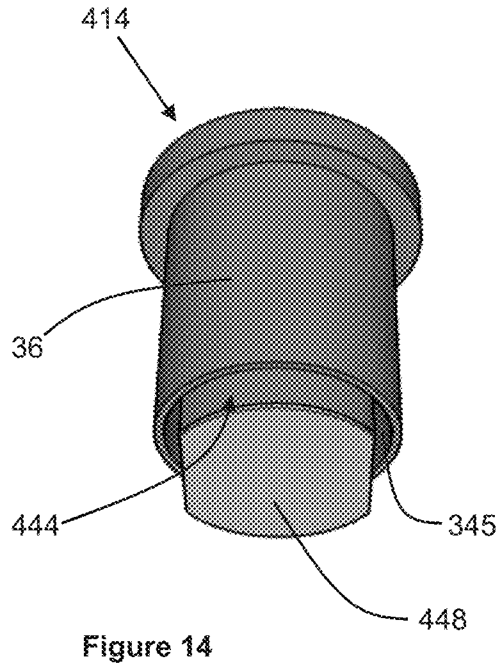
FIG. 14 is a perspective view of another cartridge of an aerosol-generating system according to an example embodiment.
Figure 15:
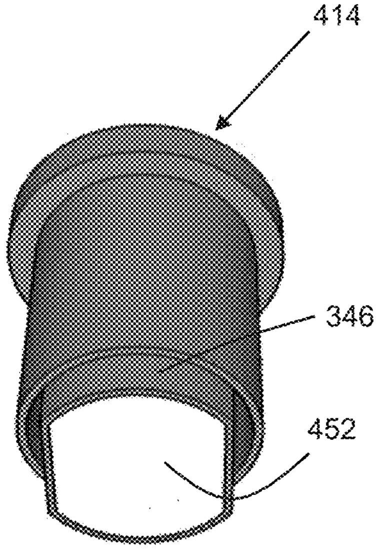
FIG. 15 is a perspective view of the cartridge of FIG. 14 with the removable seal removed.

FIGS. 14 and 15 show an alternative arrangement of a cartridge 414 according to an example embodiment. The cartridge 414 is similar in construction to the cartridge 314 described with reference to FIGS. 10 and 11, and like reference numerals are used to designate like parts.

The cartridge 414 comprises a cartridge housing 36, a solid aerosol-forming substrate 38, a liquid aerosol-forming substrate 40, a mesh filter 42 and a tubular liquid storage housing 346 as described previously. The cartridge 414 differs from the cartridge 314 by the remaining construction of the liquid storage assembly 444. In particular, the porous carrier material 452 on which the liquid aerosol-forming substrate 40 is received is a solid plug of material and does not include a passage extending through the porous carrier material 452. In this example embodiment, a removable seal 448 rather than a frangible seal extends across the upstream end of the liquid storage housing 346.

Figure 16:
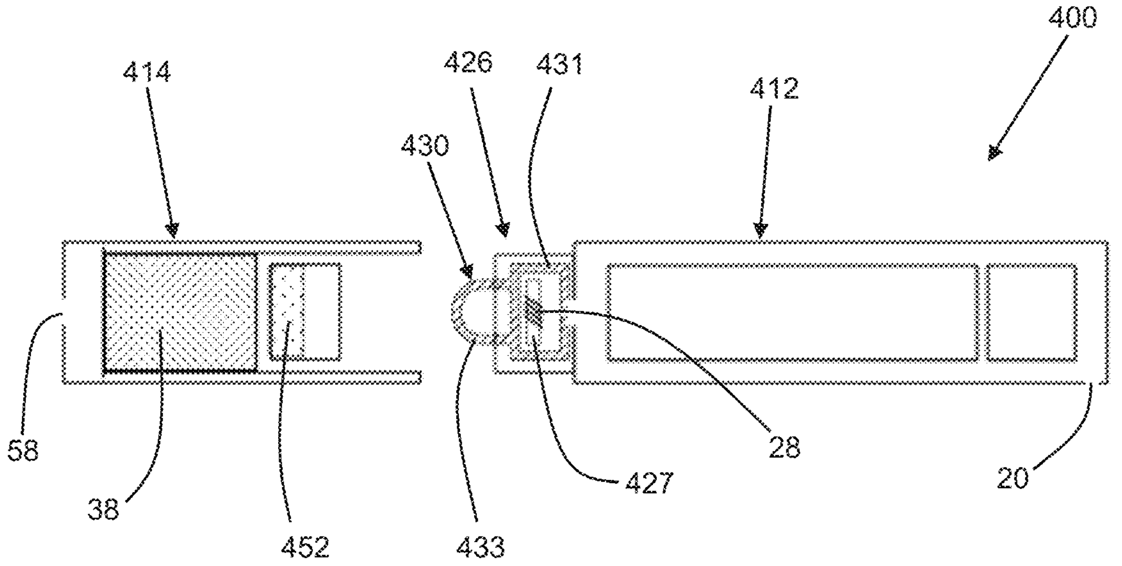
FIG. 16 is a cross-sectional view of an aerosol-generating system including the cartridge of FIG. 14 wherein the cartridge is separated from the aerosol-generating device.

FIG. 16 shows an aerosol-generating system 400 comprising the cartridge 414 of FIGS. 14 and 15 in combination with an aerosol-generating device 412. The aerosol-generating device 412 is similar to the aerosol-generating device 12 described with reference to FIGS. 1 to 4, and like reference numerals are used to designate like parts.

The aerosol-generating device 412 differs from the aerosol-generating device 12 by the construction of the heater section 426. In this example embodiment, the heater section 426 does not comprise a piercing element. Instead, the heater section 426 comprises a rigid support member 427 on which the electric heater 28 is provided. The rigid support member 427 may comprise a heat resistant material, such as a ceramic.

The heater section 426 comprises a liquid transfer element 430 having an upstream portion 431 wrapped around the electric heater 28 and the rigid support member 427, and a downstream portion 433 configured to engage the porous carrier material 452 of the cartridge 414 once the removable seal 448 has been removed.

Figure 17:
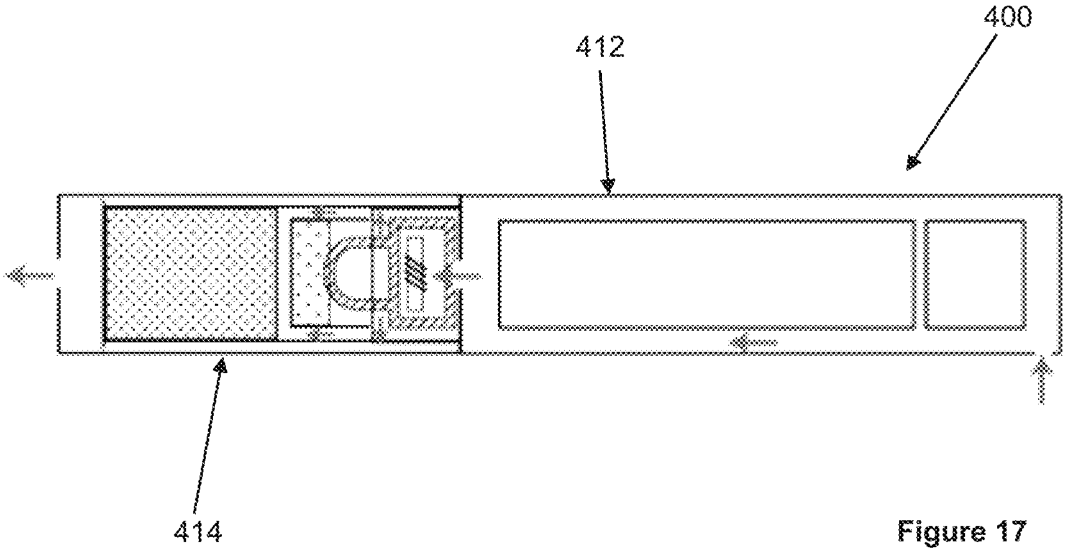
FIG. 17 is a cross-sectional view of the aerosol-generating system of FIG. 16 wherein the cartridge is inserted into the aerosol-generating device.

FIG. 17 shows a cross-sectional view of the aerosol-generating system 400 after the cartridge 414 has been combined with the aerosol-generating device 412. When the cartridge 414 is combined with the aerosol-generating device 412 the downstream portion 433 of the liquid transfer element 430 contacts the upstream surface of the porous carrier material 452. Liquid aerosol-forming substrate 40 is wicked along the liquid transfer element 430 to the electric heater 28 where it is vaporised. When a negative pressure is applied to the mouthpiece 56, air is drawn into the aerosol-generating system 400 through the airflow inlet 20, through the aerosol-generating device 412, across the electric heater 28 and through the liquid transfer element 430 where liquid aerosol-forming substrate vapour is entrained in the airflow, through the airflow passage 345 in the cartridge 414, through the solid aerosol-forming substrate 38 where further volatile compounds are entrained in the airflow, and out through the airflow outlet 58.

Figure 18:
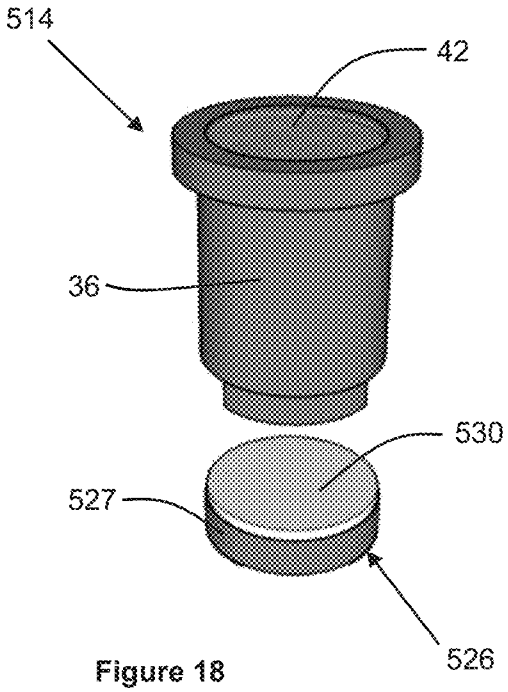
FIG. 18 is a first perspective view of a cartridge and a heater section of an aerosol-generating system according to an example embodiment.
Figure 19:
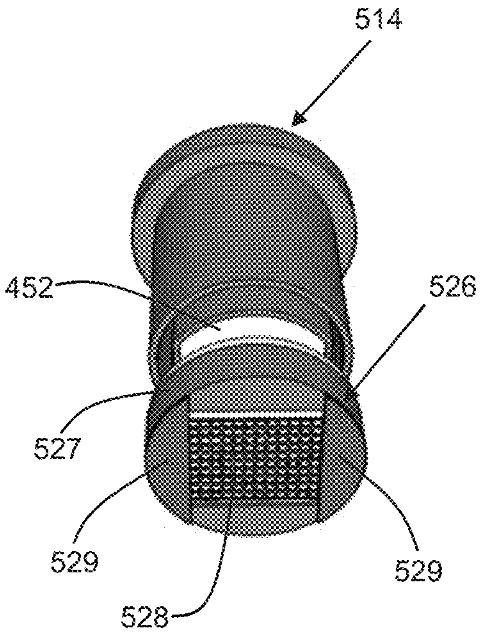
FIG. 19 is a second perspective view of the cartridge and the heater section of FIG. 18.

FIGS. 18 and 19 show an alternative arrangement of a cartridge 514 and a heater section 526 according to an example embodiment. The cartridge 514 may be identical to the cartridge 414 described with reference to FIGS. 14 and 15, and like reference numerals are used to designate like parts. The cartridge 514 may or may not include a removable seal extending across the upstream end of the tubular liquid storage housing 346.

The heater section 526 comprises a tubular support member 527, an electric heater 528 in the form of a resistive mesh heater extending across an upstream end of the tubular support member 527 and a liquid transfer element 530 extending across a downstream end of the tubular support member 527. Electrical contacts 529 facilitate electrical connection of the resistive mesh heater to a power supply of an aerosol-generating device.

Figure 20:
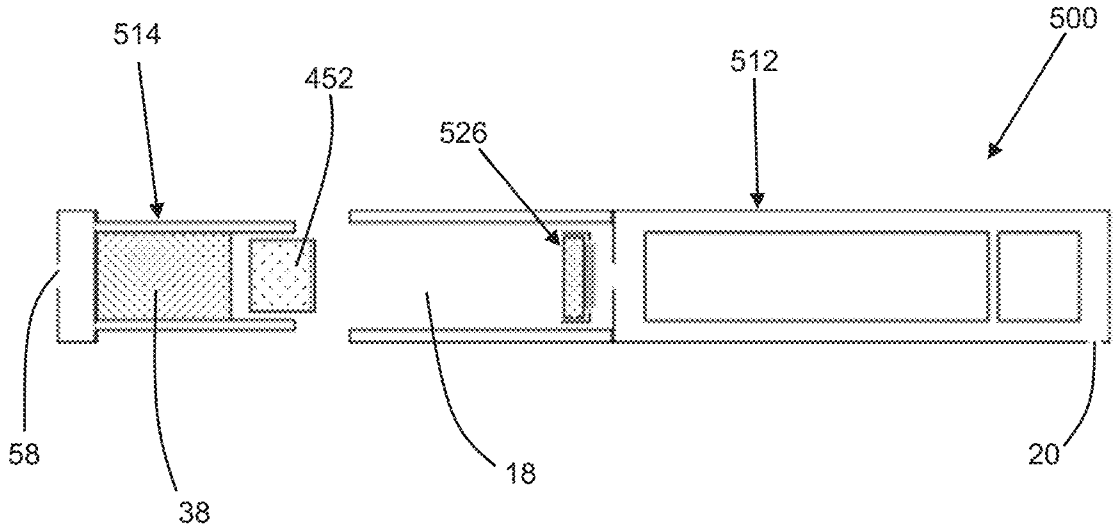
FIG. 20 is a cross-sectional view of an aerosol-generating system including the cartridge and the heater section of FIG. 18 wherein the cartridge is separated from the aerosol-generating device.

FIG. 20 shows an aerosol-generating system 500 comprising the cartridge 514 of FIGS. 18 and 19 in combination with an aerosol-generating device 512. The aerosol-generating device 512 is similar to the aerosol-generating device 12 described with reference to FIGS. 1 to 4, and like reference numerals are used to designate like parts. Instead of a heater section, the aerosol-generating device 512 comprises electrical contacts positioned at an upstream end of the cavity 18 for connecting to the electrical contacts 529 of the heater section 526 when the heater section 526 and the cartridge 514 are received within the cavity 18.

Figure 21:
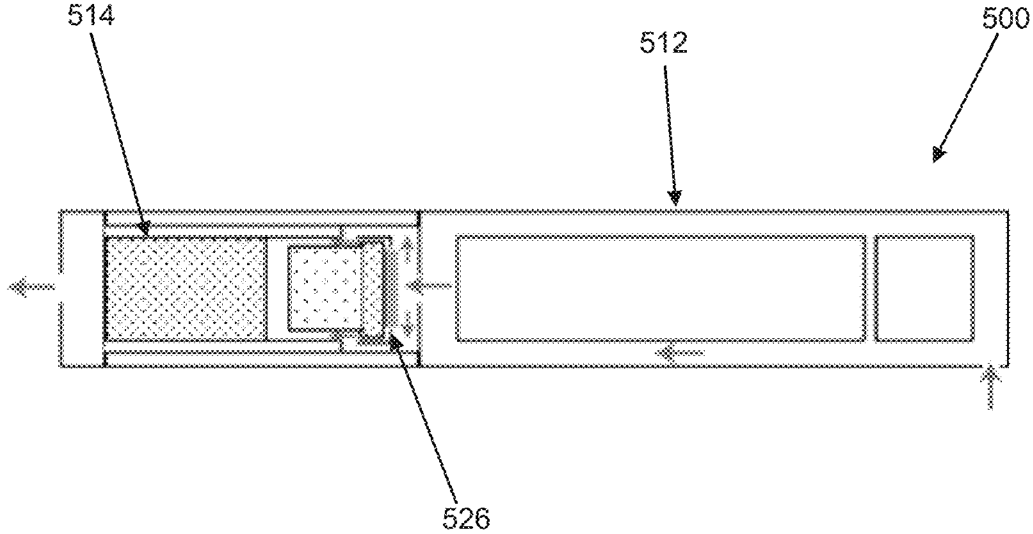
FIG. 21 is a cross-sectional view of the aerosol-generating system of FIG. 20 wherein the cartridge is inserted into the aerosol-generating device.

FIG. 21 shows a cross-sectional view of the aerosol-generating system 500 after the cartridge 514 and the heater section 526 have been combined with the aerosol-generating device 512. When the cartridge 514 is combined with the heater section 526 and the aerosol-generating device 512, the downstream end of the liquid transfer element 530 contacts the upstream surface of the porous carrier material 452. Liquid aerosol-forming substrate 40 is wicked through the liquid transfer element 530 to the electric heater 528 where it is vaporised. When a negative pressure is applied to the mouthpiece 56, air is drawn into the aerosol-generating system 500 through the airflow inlet 20, through the aerosol-generating device 512, across the electric heater 528 where liquid aerosol-forming substrate vapour is entrained in the airflow, through the airflow passage 345 in the cartridge 514, through the solid aerosol-forming substrate 38 where further volatile compounds are entrained in the airflow, and out through the airflow outlet 58.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An aerosol-generating system comprising:

a cartridge including, a cartridge housing, a solid aerosol-forming substrate in the cartridge housing, and a liquid storage housing in the cartridge housing, the liquid storage housing including a porous carrier material, the porous carrier material holding a liquid aerosol-forming substrate, the cartridge housing and the liquid storage housing defining an airflow passage therebetween; and a heater section including, a heater including a hollow shaft portion and a piercing portion at an end of the hollow shaft portion, the hollow shaft portion defining one or more airflow apertures in fluid communication with the airflow passage; and a liquid transfer element configured to contact the porous carrier material.

2. The aerosol-generating system according to claim 1, wherein a downstream end of the airflow passage is in fluidic communication with the solid aerosol-forming substrate.

3. The aerosol-generating system according to claim 1, further comprising:

an aerosol-generating device including a device housing, wherein a power supply is within the device housing, and the device housing is configured to receive the cartridge.

4. The aerosol-generating system according to claim 1, wherein the heater section is separate from the cartridge.

5. The aerosol-generating system according to claim 1, wherein the heater is an electric heater.

6. The aerosol-generating system according to claim 1, wherein the liquid transfer element is in direct contact with the porous carrier material.

7. The aerosol-generating system according to claim 1, wherein the cartridge includes a frangible seal, and the piercing portion of the heater section is configured to pierce the frangible seal.

8. The aerosol-generating system according to claim 1, wherein a first portion of the liquid transfer element is positioned inside the hollow shaft portion, and the heater includes a resistive heating coil at least partially wound around the first portion of the liquid transfer element.

9. The aerosol-generating system according to claim 8, wherein the liquid transfer element extends through an aperture in the hollow shaft portion, and a second portion of the liquid transfer element overlies an outer surface of the hollow shaft portion.

10. The aerosol-generating system according to claim 9, wherein the porous carrier material has an annular shape defining a passage through the porous carrier material.

11. The aerosol-generating system according to claim 10, wherein the piercing portion is configured to be at least partially received within the passage, and the second portion of the liquid transfer element is configured to contact an inner surface of the porous carrier material when the piercing portion is at least partially received within the passage.

12. The aerosol-generating system according to claim 9, wherein the piercing portion is tapered and includes a first diameter at a first end of the piercing portion, the hollow shaft portion has a shaft diameter adjacent the first end of the piercing portion, and the shaft diameter of the hollow shaft portion is less than the first diameter of the piercing portion.

13. The aerosol-generating system according to claim 12, wherein a thickness of the second portion of the liquid transfer element is equal to or less than a difference between the first diameter of the piercing portion and the shaft diameter of the hollow shaft portion.

14. The aerosol-generating system according to claim 9, wherein the heater section includes a securing ring positioned around the hollow shaft portion, and at least part of the second portion of the liquid transfer element is between the securing ring and the hollow shaft portion.

15. The aerosol-generating system according to claim 1, wherein the cartridge includes a removable seal overlying an upstream end of the porous carrier material.

16. The aerosol-generating system according to claim 1, wherein the liquid transfer element includes an upstream portion in contact with the heater and a downstream portion configured to contact the porous carrier material.

17. The aerosol-generating system according to claim 16, wherein the upstream portion of the liquid transfer element is wrapped around the heater.

18. The aerosol-generating system according to claim 1, wherein the heater includes a resistive heating mesh.

19. The aerosol-generating system according to claim 1, further comprising:

a power supply configured to supply electrical power to the heater.

* * * * *